United States Patent
Chan et al.

(10) Patent No.: US 9,996,334 B2
(45) Date of Patent: Jun. 12, 2018

(54) DEPLOYING AND UTILIZING A SOFTWARE LIBRARY AND CORRESPONDING FIELD PROGRAMMABLE DEVICE BINARY

(71) Applicant: INTERNATIONAL BUSINESS MACHINES CORPORATION, Armonk, NY (US)

(72) Inventors: Yuk L. Chan, Rochester, NY (US); Andrew P. Wack, Millbrook, NY (US); Peter B. Yocom, LaGrangeville, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 6 days.

(21) Appl. No.: 15/271,742

(22) Filed: Sep. 21, 2016

(65) Prior Publication Data

US 2018/0081660 A1    Mar. 22, 2018

(51) Int. Cl.
*G06F 9/44* (2006.01)
*G06F 9/45* (2006.01)
(Continued)

(52) U.S. Cl.
CPC .................. *G06F 8/61* (2013.01); *G06F 8/36* (2013.01); *G06F 8/30* (2013.01); *G06F 8/40* (2013.01);
(Continued)

(58) Field of Classification Search
CPC ...... G06F 21/51; G06F 21/52; G06F 17/5027; G06F 9/445; G06F 9/5016; G06F 9/5044;
(Continued)

(56) References Cited

U.S. PATENT DOCUMENTS 5,530,862 A * 6/1996 Wadsworth ............. G06F 9/445
713/1
6,369,610 B1 * 4/2002 Cheung ................ G06F 7/5324
326/39
(Continued)

FOREIGN PATENT DOCUMENTS

| CN | 101826025 A | 9/2010 |
|----|-------------|--------|
| CN | 103885771 A | 6/2014 |
| CN | 104881666 A | 9/2015 |

OTHER PUBLICATIONS

Andrew J. Kornecki et al., Hardware Certification for Real-time Safety-critical Systems: State of the Art, 2010, [Retrieved on Nov. 20, 2017]. Retrieved from the internet: <URL: https://pdfs.semanticscholar.org/b965/94ad25ee5d9e9384e6ed7calc0b502a6b236.pdf?> 13 Pages (163-174).*

(Continued)

*Primary Examiner* — Anibal Rivera
(74) *Attorney, Agent, or Firm* — Cantor Colburn LLP; William A. Kinnaman, Jr.

(57) ABSTRACT

Examples of techniques for deploying a software library and a corresponding field programmable device binary are disclosed. In one example implementation according to aspects of the present disclosure, a computer-implemented method may include: determining whether the software library and the field programmable device binary are available; determining whether to deploy the field programmable device binary to a field programmable device; determining whether to install the software library for use on a general purpose processor; responsive to determining to install the field programmable device binary to the field programmable device, deploying the field programmable device binary to the field programmable device; and responsive to determining to install the software library for use on the general (Continued)

purpose processor, installing the software library for use the general purpose processor.

13 Claims, 6 Drawing Sheets

(51) Int. Cl.
*G06F 17/30* (2006.01)
*G06F 9/48* (2006.01)
*G06F 9/445* (2006.01)
G06F 9/50 (2006.01)
G06F 21/51 (2013.01)
G06F 17/50 (2006.01)

(52) U.S. Cl.
CPC .......... *G06F 9/5016* (2013.01); *G06F 9/5027* (2013.01); *G06F 17/5027* (2013.01); *G06F 21/51* (2013.01)

(58) Field of Classification Search
CPC .... G06F 9/542; G06F 9/44521; G06F 9/5027; G06F 8/30; G06F 8/447; G06F 8/40; G06F 8/36
See application file for complete search history.

(56) References Cited

U.S. PATENT DOCUMENTS

| | | | | |
|---|---|---|---|---|
| 7,496,539 | B1* | 2/2009 | Bai | G06Q 30/02 369/29.01 |
| 8,081,079 | B1* | 12/2011 | Camarota | G06K 19/07758 340/572.1 |
| 8,305,903 | B1* | 11/2012 | Louise | G01R 13/0272 370/241 |
| 9,032,344 | B2 | 5/2015 | Chene | |
| 9,563,446 | B2* | 2/2017 | Sandlin | G06F 8/40 |
| 2004/0111248 | A1* | 6/2004 | Granny | G06F 17/5027 703/22 |
| 2007/0074045 | A1* | 3/2007 | Van Essen | H04L 63/0428 713/189 |
| 2009/0063709 | A1* | 3/2009 | Rice | G06F 9/445 710/1 |
| 2011/0231644 | A1* | 9/2011 | Ishebabi | G06F 8/447 713/100 |
| 2012/0324417 | A1* | 12/2012 | Somani | G06F 8/30 717/101 |
| 2014/0279985 | A1* | 9/2014 | Fontenot | G06F 21/51 707/698 |
| 2015/0040112 | A1* | 2/2015 | Valencia | G06F 8/36 717/168 |
| 2015/0067220 | A1* | 3/2015 | Schwach | G06F 13/24 710/269 |
| 2015/0205714 | A1* | 7/2015 | Greenfield | G06F 9/5016 711/158 |
| 2015/0309789 | A1 | 10/2015 | Thorat | |
| 2016/0048391 | A1 | 2/2016 | Somani et al. | |
| 2016/0314025 | A1* | 10/2016 | McGarry | G06F 9/542 |
| 2016/0328230 | A1* | 11/2016 | Schneider | G06F 8/30 |
| 2016/0335120 | A1* | 11/2016 | Gupta | G06F 9/5044 |
| 2016/0350529 | A1* | 12/2016 | Kerr | G06F 21/52 |
| 2017/0039050 | A1* | 2/2017 | Eltsin | G06F 9/44521 |
| 2017/0083703 | A1* | 3/2017 | Abbasi | G06F 21/566 |
| 2017/0097851 | A1* | 4/2017 | Chen | G06F 9/5027 |

OTHER PUBLICATIONS

Michael Dalton et al., Raksha: A Flexible Information Flow Architecture for Software Security, ACM 978-1-59593-706-3, Jun. 9-13, 2007, [Retrieved on Nov. 20, 2017]. Retrieved from the internet: <URL: http://delivery.acm.org/10.1145/1260000/1250722/p482-dalton.pdf?> 12 Pages (482-493).*

Volodymyr Kuznetsov et al., Testing Closed-Source Binary Device Drivers with DDT, 2010, [Retrieved on Nov. 20, 2017]. Retrieved from the internet: <URL: http://static.usenix.org/events/atc10/tech/full_papers/Kuznetsov.pdf> 14 Pages (1-14).*

M. Lin, et al.,"OpenRCL: Low-Power High-Performance Computing with Reconfigurable Devices", International Conference on Filed Programmable Logic and Applications, 2010, p. 1-6.

List of IBM Patent Applications Treated as Related; Date Filed Oct. 12, 2016, p. 1-2.

Yuk L. Chan, et al., "Managing Workload Distribution Among Processing Systems Based on Field Programmable Devices" U.S. Appl. No. 15/271,753, filed Sep. 21, 2016.

Yuk L. Chan, et al.,"Deploying and Utilizing a Software Library and Corresponding Field Programmable Device Binary", U.S. Appl. No. 15/271,789, filed Sep. 21, 2016.

Yuk L. Chan, et al.," Enabling a Field Programmable Device On-Demand", U.S. Appl. No. 15/271,720, filed Sep. 21, 2016.

Yuk L. Chan, et al.," Reprogramming a Field Programmable Device On-Demand", U.S. Appl. No. 15/271,728, filed Sep. 21, 2016.

Yuk L. Chan, et al.,"Resource Sharing Management of a Field Programmable Device", U.S. Appl. No. 15/271,780, filed Sep. 21, 2016.

Yuk L. Chan, et al.,"Service Level Management of a Workload Defined Environment" U.S. Appl. No. 15/271,770, filed Sep. 21, 2016.

Yuk L. Chan, et al.,"Service Level Management of a Workload Defined Environment", U.S. Appl. No. 15/271,760, filed Sep. 21, 2016.

* cited by examiner

DEPLOYING AND UTILIZING A SOFTWARE LIBRARY AND CORRESPONDING FIELD PROGRAMMABLE DEVICE BINARY

BACKGROUND

The present application generally relates to field programmable devices and, more particularly, to deploy and utilize a software library and a corresponding field programmable device binary.

Special purpose processing units are gaining popularity due to their high performance. In some situations, hardware manufacturers have begun adding field-programmable device-based special purpose processing units to computing systems to improve performance and cost to run a special workload. A field-programmable device (FPD) such as a field programmable gate array (FPGA), a programmable read-only memory (PROM), or a programmable logic device (PLD) provides more flexibility compared to traditional integrated circuit manufacturing by allowing updating of functionality after shipping the computing system (i.e., while the computing system is in the field). The update of functionality of an FPD is currently limited to firmware upgrades, service related tasks, or a human decision to re-purpose an FPD.

One issue that software vendors face when enabling their software libraries to exploit FPDs is how to provide application program interfaces (APIs) that can take advantage of an FPD when one is available but also provide compatible functionality when an FPD is not available. It is important for software vendors to provide this type of compatibility to allow their software to be used by both customers who have a computing system with FPDs and customers that do not have FPDs. An example of this approach is provided by IBM's z/OS operating system. z/OS supports the IBM z Systems Data Compression (zEDC) which is an FPD that provides acceleration for data compression. Provided with z/OS is a modified version of the zlib data compress software library. The modified zlib may use a zFDC to accelerate data compression requests. The modified zlib may use a zEDC in certain cases except: 1) when no zEDC is available in the computer system, 2) when the zlib function requested is not supported by the zEDC, or 3) when the request is too small to be efficiently processed by the zEDC. These criteria to use the zEDC are static in nature and there is no attempt to make dynamic runtime trade-off decisions on whether it is appropriate to use a zEDC for a given API call.

SUMMARY

According to examples of the present disclosure, techniques including methods, systems, and/or computer program products for deploying a software library and a corresponding field programmable device binary are provided. An example method may include: determining whether the software library and the field programmable device binary are available; determining whether to deploy the field programmable device binary to a field programmable device; determining whether to install the software library for use on a general purpose processor; responsive to determining to install the field programmable device binary to the field programmable device, deploying the field programmable device binary to the field programmable device; and responsive to determining to install the software library for use on the general purpose processor, installing the software library for use the general purpose processor.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

The present techniques provide for invoking either a software program or a field programmable device to perform a processing job (i.e., a workload). In particular, the present techniques provide for the deployment of a software library and a corresponding field programmable device (FPD) binary to a processing system. One of the software library and the FPD binary is selectable for performing the processing job, for example, based on a load on the FPD, a load on the general processor of the processing system, cost, and other factors.

In some implementations, the present techniques provide improved functioning of the computing system by enabling a processing system to efficiently process jobs (i.e., workloads) by determining whether to use a software library or an FPD binary to process the jobs. Additionally, the present techniques reduce system resource demands on the general processor of the computing system by enabling FPDs to perform specialized tasks (e.g., encoding/decoding of data, data encryption, data analytics, etc.). The present techniques also provide the ability to monitor and track the time that an FPD is utilized so that a user may be billed for the time. In addition, the present techniques enable increased system performance by enabling FPDs to be updated to perform different specialized tasks, thereby reducing the resource demands on the computing system's native resources (i.e., memory, general processor, etc.). These and other advantages will be apparent from the description that follows.

Figure 1:
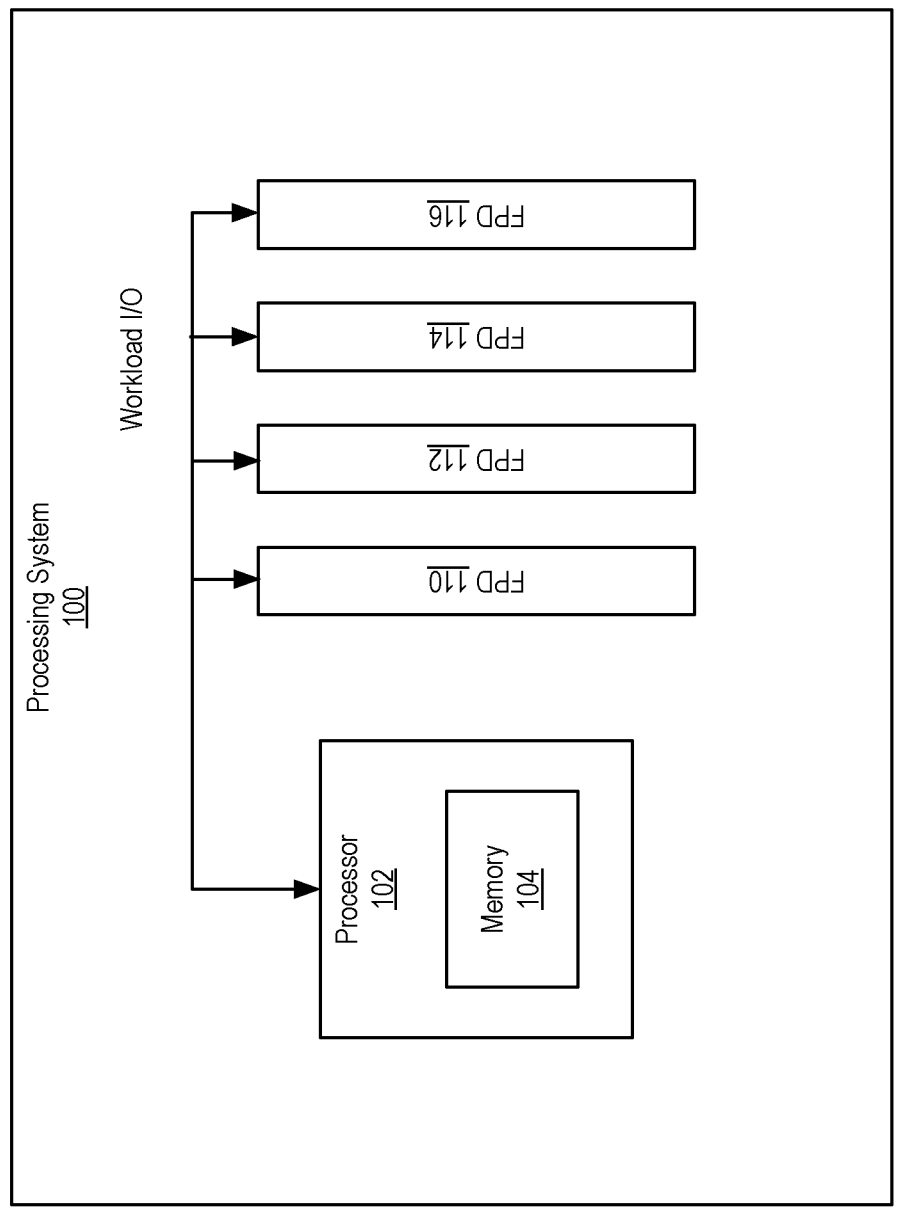
FIG. 1 illustrates a block diagram of a processing system for deploying and utilizing a software library and a corresponding field programmable device binary according to examples of the present disclosure.

FIG. 1 illustrates a block diagram of a processing system 100 for deploying and managing a software library and a corresponding field programmable device binary according to examples of the present disclosure. The processing system 100 includes a processor 102 that may be a general purpose processor and a memory 104 associated with the processor 102. The processor 102 is responsible for executing computer readable instructions stored in the memory 104. For example, the processor 102 may execute an operating system and one or more applications running within the operating system.

In some situations, specialized tasks may be offloaded onto a field programmable device. The FPD may execute computer readable instructions to perform a specialized task, such as encoding/decoding of data, data encryption, data analytics, or other tasks that are suitable for execution on a field programmable device. By offloading these specialized tasks to field programmable devices, the processing system 100 and its processor 102 is free to perform other tasks. In the example of FIG. 1, the processing system 100 includes four field programmable devices (e.g., FPD 110, FPD 112, FPD 114, and FPD 116), which may be configured with logic for executing a specialized task.

Figure 2:
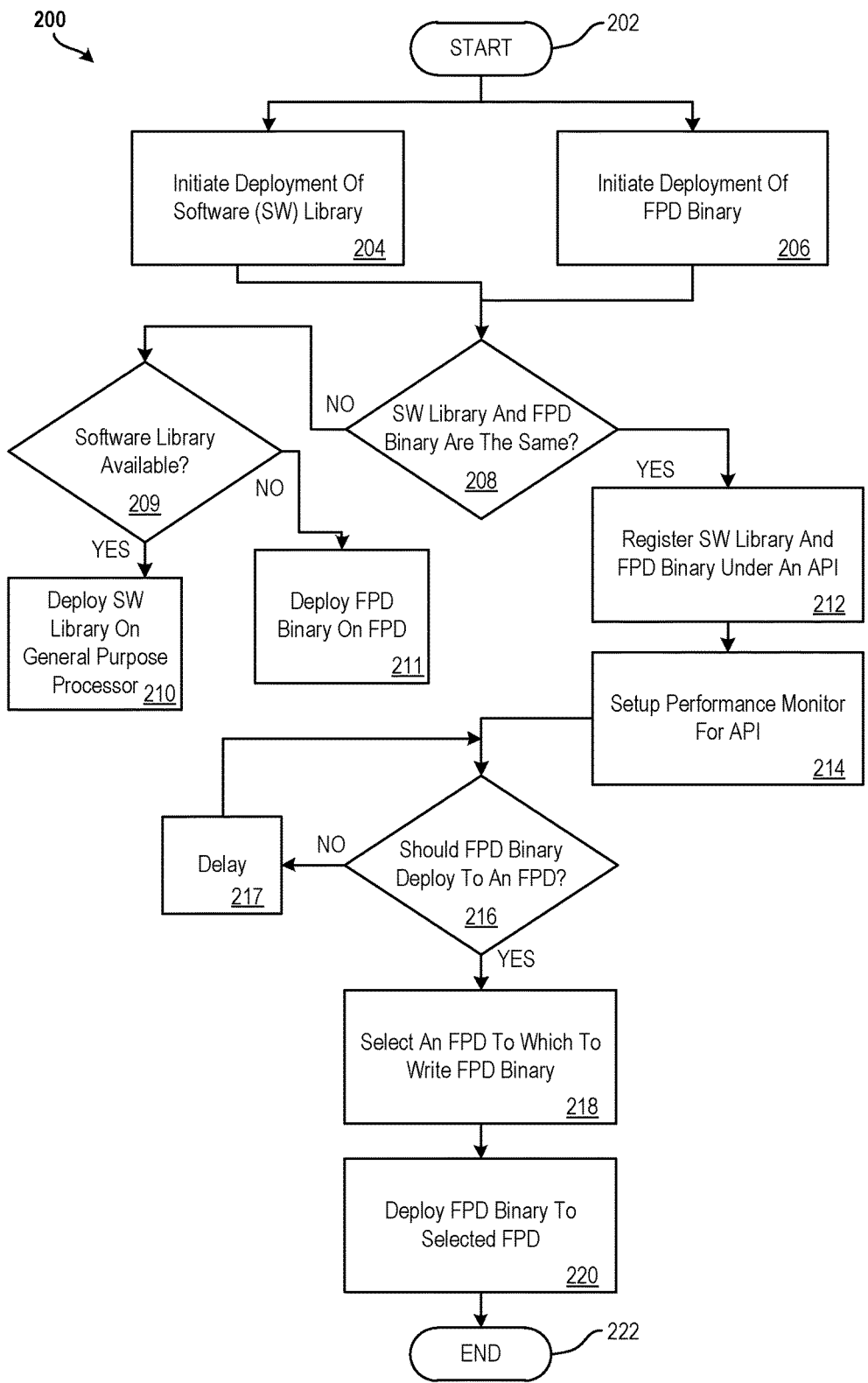
FIG. 2 illustrates a flow diagram of a method for deploying a software library and a corresponding field programmable device binary according to examples of the present disclosure.

FIG. 2 illustrates a flow diagram of a method 200 for deploying a software library and a corresponding field programmable device binary according to examples of the present disclosure. The method 200 may be performed, for example, by a processing system such as the processing system 100 of FIG. 1, by the processing system 20 of FIG. 6, or by another suitable processing system. The method 200 starts at block 202 and continues to blocks 204 and 206.

At block 204, the method 200 includes initiating deployment of the software (SW) library, and at block 206, the method 200 includes initiating deployment of the FPD binary. It should be appreciated that initiating deployment of the software library and the field programmable device binary may occur simultaneously, concurrently, or sequentially.

At decision block 208, the method 200 includes determining whether the software library and the FPD binary are the same. That is, the method 200 determines whether the SW library and the field programmable device binary perform the same function (i.e., execute the same type job, produce the same result, etc.). If it is determined at decision block 208 that the software library and the field programmable device binary are not the same, then it is determined which one of the software library and the field programmable device binary are available at block 209. If it is determined at decision block 209 that the software library is available (versus the field programmable device binary, the software library is deployed on a general purpose processor of the processing system (e.g., processor 102 of the processing system 100 of FIG. 1), as shown at block 210. In this case, future jobs that call the software library will be completed by the software library executing on the general purpose processor. If, however, it is determined at decision block 209 that the field programmable device binary is available (versus the software library), the field programmable device binary is deployed on the field programmable device (e.g., FPD 110 of the processing system 100 of FIG. 1) as shown at block 210. In this case, future jobs that call the field programmable device binary will be completed by the field programmable device binary executing on the field programmable device. Although not illustrated in FIG. 2, after block 210 or 211 conclude, the method 200 may return to decision block 208 to provide for the situation where one of a software library or a field programmable device binary is later provided that was not available previously.

If, however, it is determined at decision block 208 that the SW library and the FPD binary are the same, then the software library and the field programmable device binary are registered under an application program interface (API) at block 212. The API may be used (i.e., called) by software application executing on the processing system (e.g., the processing system 100) to perform specific functions using either the software library or the field programmable device binary.

At block 214, the method 200 includes setting up a performance monitor for the API. The performance monitor monitors various aspects of the API, including a load, a capacity, a processing time, a delay associated with processing a workload, etc.

At decision block 216, it is determined whether to deploy the field programmable device binary to a field programmable device. Whether to deploy the field programmable device binary to a field programmable device may be based on whether a field programmable device is available to perform the particular workload type, whether the cost of using the field programmable device satisfies a goal (i.e., a goal outlined in a service level agreement), whether the general purpose processor has capacity to perform the workload, what types of workloads that field programmable devices are already configured to perform, the workload on the field programmable device, whether running the workload on the field programmable device is more optimal compare to running the workload on the general purpose processor based on cost, performance, etc.

If it is determined not to deploy the field programmable device binary to a field programmable device at decision block 216, the method 200 includes waiting a delay at block 217, then returning to decision block 216. If, however, it is determined to deploy the field programmable device binary to a field programmable device at decision block 216, the method 200 includes selecting a field programmable device to which to write the field programmable binary. Selecting the field programmable device may be based on factors such as the availability and type of the field programmable devices, costs associated with using the field programmable devices, and the like.

Once the field programmable device is selected, the method 200 includes deploying the field programmable device binary to the selected field programmable device at block 220. The method 200 continues to block 222 and ends. Additional processes also may be included, and it should be understood that the processes depicted in FIG. 2 represent illustrations, and that other processes may be added or existing processes may be removed, modified, or rearranged without departing from the scope and spirit of the present disclosure.

In some examples, the software library of block 204 can be part of a broader scope software library. This broader scope software library could be a deployable unit, while the software library of block 204 is not separately deployable. For example, the broader scope software library can be a cryptographic library, which contains software libraries for elliptic curve encryption, digital signature verification, and hash calculation. There can be a field programmable device binary for digital signature verification, a separate field programmable device binary for the hash calculation, but there may be no field programmable device binary for elliptic curve encryption.

In some examples, blocks 204 and 206 could include a lookup or search capability for a software library and a field programmable binary from a repository respectively. The repository can be hosted locally on a computing system, locally within a corporation, online from a software vendor, or online such as in a store.

In some examples, block 206 could include using a field programmable binary that is shipped with the software library. Block 204 could include using a software library that's shipped with a field programmable device binary. The field programmable binary and the software library can be shipped together in a physical digital media such as a compact disc, or downloaded together as a file from an online resource.

In some examples, block 206 could include a conversion of the software library to field programmable device binary. Block 204 could include a conversion of the field programmable device binary to a software library. The software library can be in a format that is understandable by a computer application program, and the computer application program is capable of converting the logic into a field programmable device binary.

In some examples, block 208 could include different ways to verify whether a software library and field programmable device binary are the same. For example, a software library vendor can certify that a field programmable device binary is the same as the software library, and provide a digital signature of the verified field programmable device binary. This could further include the software library vendor providing a list of certified field programmable device binaries from different vendors for the each software library and, optionally, a method to acquire the certified field programmable device binaries.

In some examples, block 206 could include selecting one of the many certified field programmable device binary from different vendors. The selection can based on the characteristics of the field programmable device binary such as performance, cost, etc.

In some examples, block 208 could include a corporation that verifies the functionality of a field programmable device binary against the software library using test cases. The field programmable device binary may be approved as the same after the test cases passed successfully.

In some examples, block 208 could deploy the field programmable device binary before knowing whether the software library and the field programmable device binary are the same, and run the workload through both the software library and field programmable device binary. In this case, only the result from the software library will be used. After a reasonable amount of workload has been executed and verified that the result from the software library and field programmable device binary are the same, then, it can be confirmed that the software library and the field programmable device binary are the same.

In some examples, a software library vendor can provide a specification of the software library, and a field programmable device binary vendor can based on the specification to create the same field programmable device binary. This specification can be a protocol specification such as the transport layer security, the library input and output requirements, or other details related to the software library. The software vendor can also provide a test suite that can be used to verify whether the function of the software library is the same as the field programmable device binary.

In some examples, a field programmable device binary vendor can provide a specification of the software library, and a software library vendor can based on the specification to create the same field programmable device binary. This specification can be a protocol specification such as the transport layer security, the library input and output requirements, other details related to the software library. The field programmable device binary vendor can also provide a test suite that can be used to verify whether the function of a field programmable device binary is the same as the software library.

Figure 3:
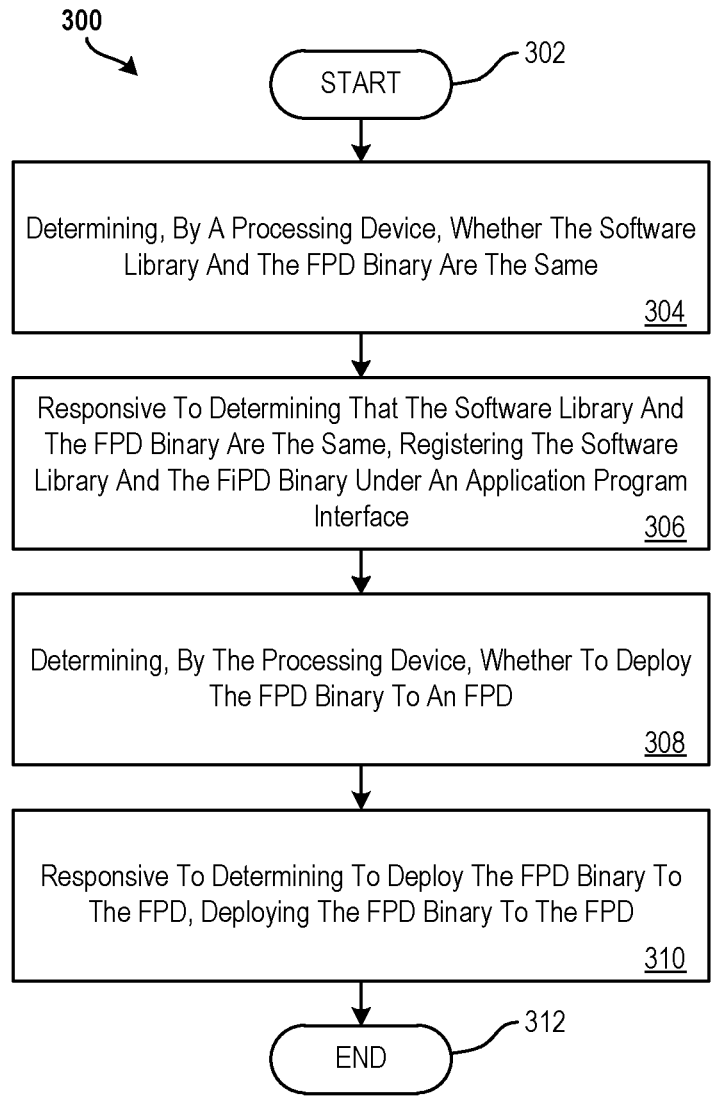
FIG. 3 illustrates a flow diagram of a method for deploying a software library and a corresponding field programmable device binary according to examples of the present disclosure.

FIG. 3 illustrates a flow diagram of a method for deploying a software library and a corresponding field programmable device binary according to examples of the present disclosure. The method 300 may be performed, for example, by a processing system such as the processing system 100 of FIG. 1, by the processing system 20 of FIG. 6, or by another suitable processing system. The method 300 starts at block 302 and continues to block 304.

At block 304, the method 300 includes determining, by a processing device, whether the software library and the field programmable device binary are the same. At block 306, the method 300 includes, responsive to determining that the software library and the field programmable device binary are the same, registering the software library and the field programmable device binary under an application program interface.

At block 308, the method 300 includes determining, by the processing device, whether to deploy the field programmable device binary to a field programmable device. It should be appreciated that the field programmable device may be one of a field-programmable gate array, a programmable read-only memory, a programmable logic device, or another suitable field programmable device.

In some examples, determining whether to deploy the field programmable device binary to the field programmable device includes comparing a workload response time to a workload response time goal. For example, field programmable device binary is deployed to the field programmable device when the workload response time satisfies the workload response time goal. When the workload response time does not satisfy the workload response time goal, the field programmable device binary is not deployed to the field programmable device and instead a delay is implemented and then the block 308 is repeated.

In some examples, a workload might use multiple libraries. Two or more of these libraries could have field programmable device binaries. The decision to selection one of the field programmable device binaries for deployment could be based on which of the field programmable device binaries provide an optimal result. The optimal result could base on the cost, performances, etc.

In some examples, multiple workloads might use the same libraries. For example, workload A uses library 1 with a corresponding field programmable device binary, workload B uses library 1 and 2, each with a corresponding field programmable device binaries, and workload C uses library 1 and 3, each with a corresponding field programmable device binary. The decision to select one of the field programmable binaries to deploy could be based on which field programmable binaries can benefit the most workloads.

At block 310, the method 300 includes, responsive to determining to deploy the field programmable device binary to the field programmable device, deploying the field programmable device binary to the field programmable device. The method 300 continues to block 312 and ends.

Additional processes also may be included. For example, the method 300 may include, responsive to determining to not deploy the field programmable device binary to the field programmable device, waiting a delay period. The method 300 may then include determining, by the processing device, whether to deploy the field programmable device binary to the field programmable device.

In some examples, the method 300 includes monitoring, by the processing device, performance of the application program interface. The performance may be monitored based on a queue or based on jobs. It should be understood that the processes depicted in FIG. 3 represent illustrations, and that other processes may be added or existing processes may be removed, modified, or rearranged without departing from the scope and spirit of the present disclosure.

Figure 4:
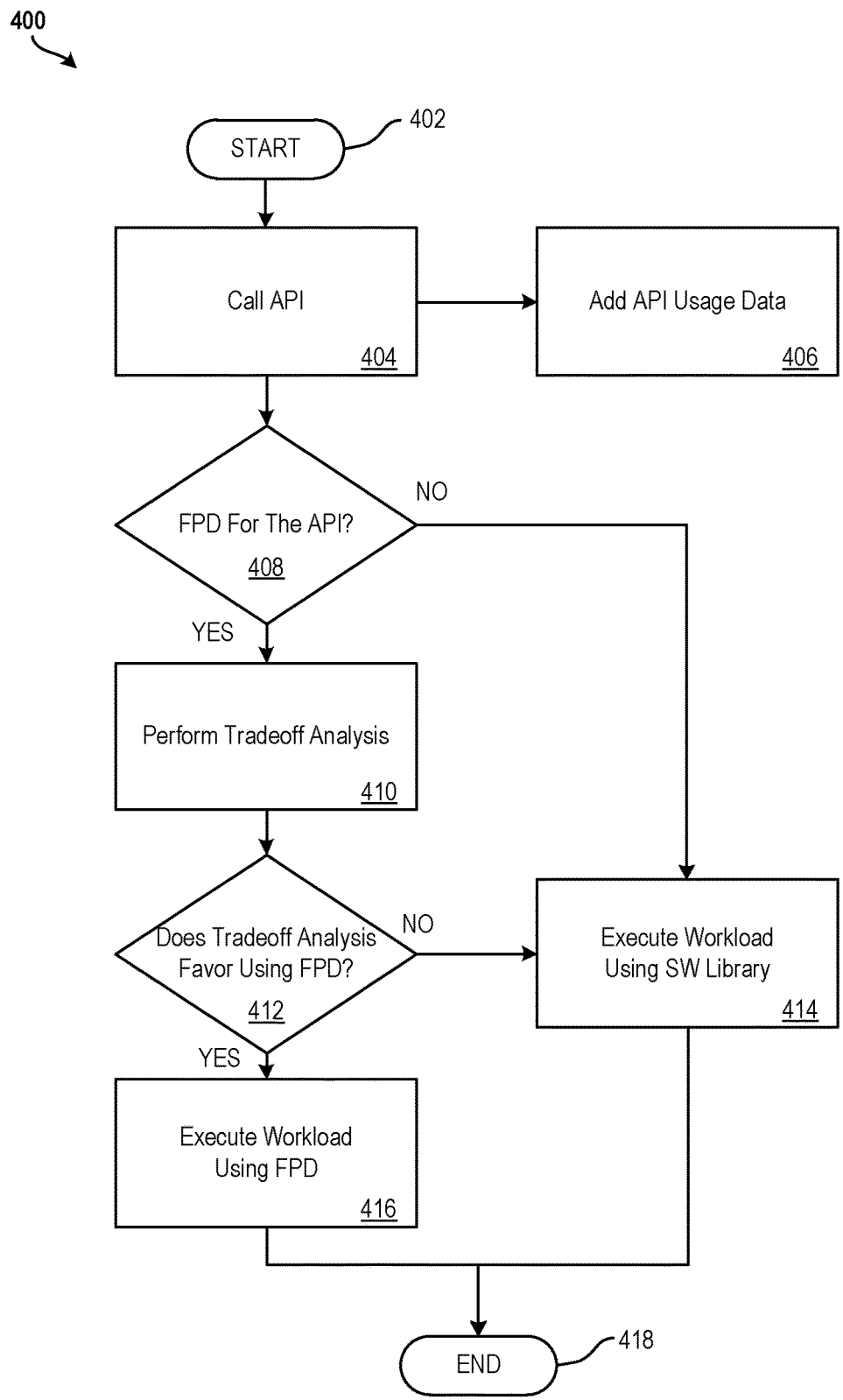
FIG. 4 illustrates a flow diagram of a method for utilizing a software library or a corresponding field programmable device binary to perform a workload according to examples of the present disclosure.

FIG. 4 illustrates a flow diagram of a method for deploying a software library and a corresponding field programmable device binary according to examples of the present disclosure. The method 400 may be performed, for example, by a processing system such as the processing system 100 of FIG. 1, by the processing system 20 of FIG. 6, or by another suitable processing system. The method 400 starts at block 402 and continues to block 404.

At block 404, the method 400 includes calling an application program interface (API) to perform a workload. The API may be registered with a software library and a field programmable device binary, such as at block 212 of FIG. 2.

At block 406, the method 400 includes adding API usage data to an API usage data store. The API usage data may be used to determine whether a field programmable binary should deploy to a field programmable device, as in block 216 of FIG. 2.

Once the API is called, the method 400 includes determining whether a field programmable device is available for the API at decision block 408. In other words, the method 400 determines whether a field programmable device binary is deployed to a field programmable device that is configured to perform the work for the API. If no field programmable device exists for the API, then the workload is executed using a software library executing on a general purpose processor (e.g., the processor 102 of FIG. 1) at block 414. If, however, it is determined that a field programmable device exists for the API, then the method 400 continues to block 410.

At block 410, the method 400 includes performing a tradeoff analysis. In an example, the tradeoff analysis includes comparing a cost of using the field programmable device to perform the workload to a cost of using the software library to perform the workload. The tradeoff analysis, in another example, includes comparing a capacity the field programmable device to a capacity of using the software library. In yet another example, the tradeoff analysis includes comparing a workload performance time of using the field programmable device to perform the workload to a workload performance time of using the software library to perform the workload.

At decision block 412, the method 400 includes determining whether the tradeoff analysis favors using the field programmable device identified at decision block 408. The field programmable device may be considered favored, for example, where a cost of using the field programmable device is less than a cost of using the software library to perform the workload. The cost may be a monetary cost that is to be paid by a user/customer, a cost in terms of system resource usage, or the like. In another example, the programmable device may be considered favored when a capacity of the field programmable device is greater than a capacity of using the software library on the general purpose processor. For example, if the field programmable device is at a greater capacity (e.g., 80%) than the general purpose processor (e.g., 50%), then it may not be favorable to use the field programmable device. In another example, a higher priority workload requiring shorter response time might be deployed to the field programmable device that performs faster than the general purpose processor, while a lower priority workload that does not require short response time might be deployed to the general purpose processor.

In an embodiment, the performance of the field programmable device and software library on general purpose processor can be normalized for comparison. The normalization could be the generation of a mapping between number of cycles required on a field programmable device and the time it takes to processor the same job on the general purpose processor. In another example, the mapping can be between the queue time that a job has waited before it get processed by a field programmable device, and the response time of a job after it's submitted to be processed by the software library, until completion.

In another example, if there are workloads that can only run in the general purpose processor and were delayed due to general processor resource shortage, any workload that could run on either general purpose processor or field programmable device can be deployed to the field programmable devices. In another example, the performance of the job can be estimated for when the job is running on the field programmable device and when the job is running on the general purpose processor. Based on this estimation, the performance can be compare against a service level agreement for the job. If the performance requirement can be satisfied when the job is deployed on both general purpose process and field programmable device, then a secondary factor can be used to make a decision. This secondary decision can be based on secondary factors such as available capacity, cost of running, power consumption, etc.

The estimation can be based on history performance of similar jobs. For example, for jobs that compressed data between 200 megabytes to 210 megabytes, the performance (e.g., average 200 ms) of jobs running on field programmable device can be compared with the performance (e.g., average 400 ms) of similar jobs running on general purpose processor. For jobs that compress data between 400 megabytes to 420 megabytes, the performance (e.g., average 400 ms) of jobs running on field programmable device can be compare with the performance (e.g., average 800 ms) of similar jobs running on general purpose processor.

It can be estimated using linear regression that a job of compressing 500 megabytes of data will take 500 ms on the field programmable device, and 1000 ms on the general processor. In another similar example, the estimation can be based on other approximation or curve fitting mechanism based on the history data pattern.

In another embodiment, a job can use multiple libraries that have corresponding field programmable device. For example, a job might utilize both compression and encryption. Compression can be performed by software library A or field programmable device binary A installed on programmable device A. Encryption can be performed by software library B or field programmable device binary B installed on programmable device binary B. Using the above tradeoff mechanism, it is possible for a job to use software library A and software library B, to use software library A and field programmable device B, to use field programmable device A and software library B, or to use field programmable device A and field programmable device B. It is also possible to estimate the performance of job for each of the combinations, and decision and tradeoffs can be made based on the service level agreement.

In another example, there is only one field programmable device available, and only one of the field programmable device binary A or field programmable device binary B can be installed on a field programmable device. The benefit of installing field programmable device binary A can be compare against the benefit of installing field programmable device binary B. For example, it is possible to install field programmable device binary A for one hour, and determine the performance and cost. Then, replace it with field programmable device binary B for one hour, and determine the performance and cost again. The performance and cost can be compared between field programmable device binary A and field programmable device binary B.

In another example, there can be multiple types of processing devices involved in the tradeoff decision. For example, there may be a special processor called IBM z Systems Application Assist Processor (zAAP) on the System z for Java workloads. In this case, a Java library that has a field programmable device binary can be processed by one of the general purpose processor, zAAP, or the field programmable device. This tradeoff decision could involve cost, performance of the job, current utilizations, negative impacts to other jobs, etc.

In another embodiment, the field programmable device or the general purpose processor can be estimated for disablement. For example, using the estimation mechanism above, it can be estimated that all jobs currently running on field programmable devices can fit onto the available capacity on the general purpose processor without adversely impacting the service level agreement. Therefore, the field programmable device can be deactivated to save on licensing cost and power consumption, or it can be reprogrammed with another field programmable device binary. In this case, the API will gradually increase the amount of jobs deployed to the general purpose processor, and gradually reduce the amount of jobs deployed to the field programmable device. In a similar example, using the estimation mechanism above, it can be estimated that all jobs currently running on general purpose processor can fit onto the available capacity on the field programmable devices without adversely impact the service level agreement.

If it is determined at decision block 412 that the tradeoff analysis favors using the field programmable device, then the workload is executed using the field programmable device at block 416. If, however, it is determined at decision block 412 that the tradeoff analysis does not favor using the field programmable device, then the workload is executed using a software library executing on a general purpose processor at block 414. The method 400 continues to block 418 and ends.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
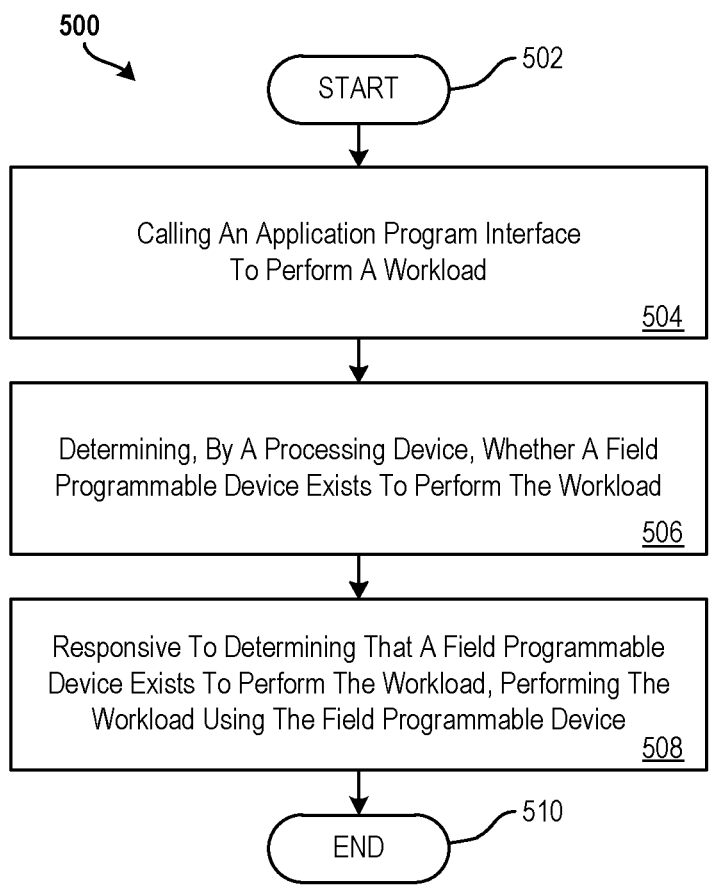
FIG. 5 illustrates a flow diagram of a method for utilizing a software library or a corresponding field programmable device binary to perform a workload according to examples of the present disclosure.

FIG. 5 illustrates a flow diagram of a method for deploying a software library and a corresponding field programmable device binary according to examples of the present disclosure. The method 500 may be performed, for example, by a processing system such as the processing system 100 of FIG. 1, by the processing system 20 of FIG. 6, or by another suitable processing system. The method 500 starts at block 502 and continues to block 504.

At block 504, the method 500 includes calling an application program interface (API) to perform a workload. The API may be registered with a software library and a field programmable device binary, such as at block 212 of FIG. 2.

At block 506, the method 500 includes determining, by a processing device, whether a field programmable device exists to perform the workload. In some examples, determining whether a field programmable device exists to perform the workload includes performing, by the processing device, a tradeoff analysis to determine whether to perform the workload utilizing the field programmable device or the software library. According to aspects of the present disclosure, the determination at block 506 may include using dynamic characteristics of the workload and/or the workload environment to determine whether to use the field programmable device or the software library to process the workload. In examples, the dynamic characteristics of the workload and the workload environment include current, historical, and projected characteristics, such as utilization of the field programmable device and general purpose processor, the power consumption, the cost, and/or the workload attributes such as number of cycle required to process the job, number of jobs, type of jobs, etc.

The tradeoff analysis may be performed in a variety of ways. For example, the tradeoff analysis includes comparing a cost of using the field programmable device to perform the workload to a cost of using the software library to perform the workload. In another example, the tradeoff analysis includes performing the tradeoff analysis further comprises comparing a capacity the field programmable device to a capacity of using the software library. In yet another example, the tradeoff analysis includes comparing a workload performance time of using the field programmable device to perform the workload to a workload performance time of using the software library to perform the workload.

At block 508, the method 500 includes, responsive to determining that a field programmable device exists to perform the workload, performing the workload using the field programmable device. It should be appreciated that the first field programmable device may be one of a field-programmable gate array, a programmable read-only memory, a programmable logic device, or another suitable field programmable device.

The method 500 continues to block 510 and ends. Additional processes also may be included. For example, the method 500 may include, responsive to determining that a field programmable device does not exist to perform the workload, performing the workload on the processing device. The processing device may be a general purpose processing device, such as the processor 102 of FIG. 1.

It should be understood that the processes depicted in FIG. 5 represent illustrations, and that other processes may be added or existing processes may be removed, modified, or rearranged without departing from the scope and spirit of the present disclosure.

Figure 6:
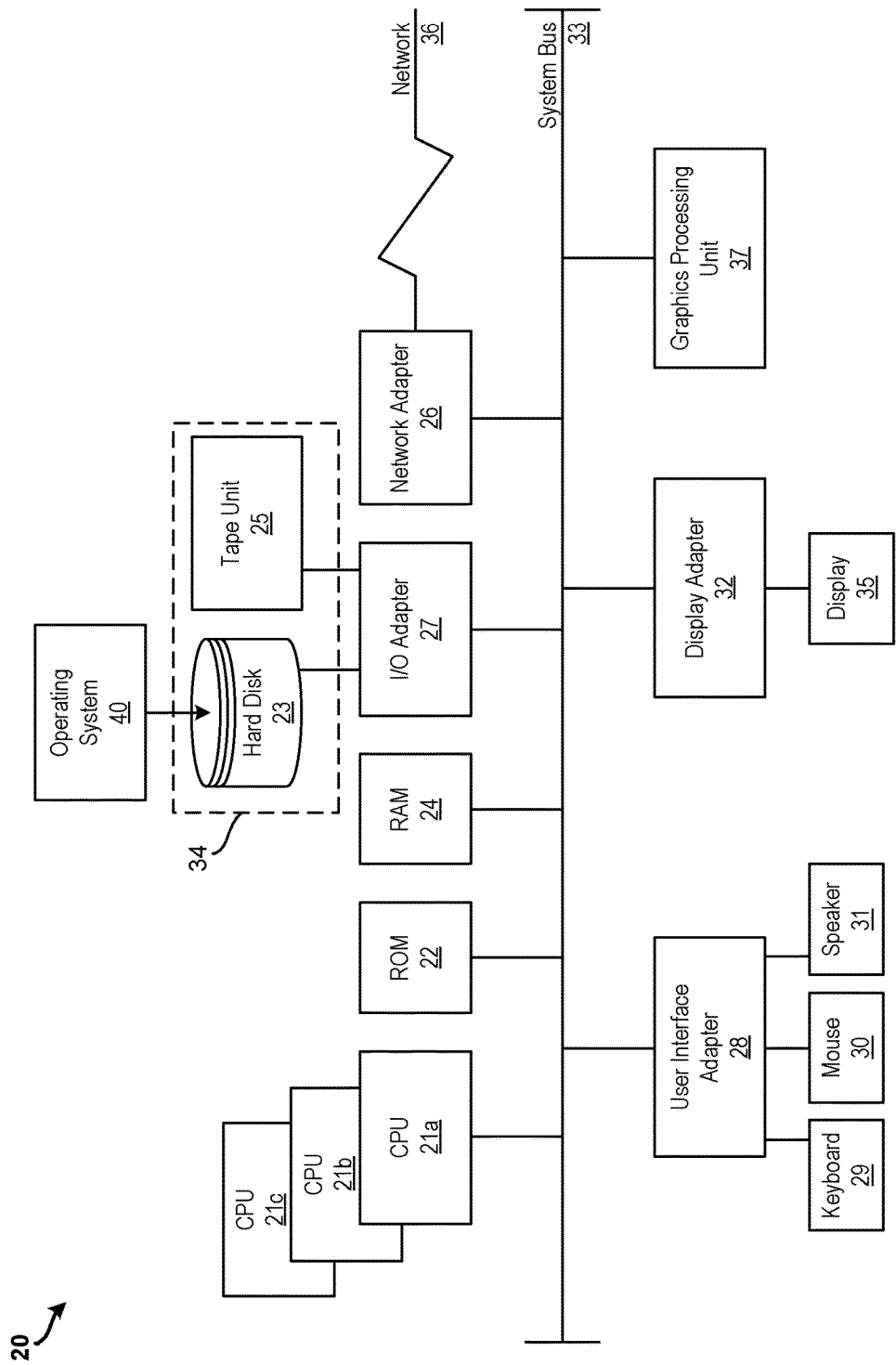
FIG. 6 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 6 illustrates a block diagram of a processing system 20 for implementing the techniques described herein. In examples, processing system 20 has one or more central processing units (processors) 21*a*, 21*b*, 21*c*, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for deploying a software library and a corresponding field programmable device binary, the method comprising:
   determining, by a processing device, whether the software library and the field programmable device binary are the same, which comprises receiving a verification certification from a software library vendor of the software library;
   responsive to determining the software library and the field programmable device binary are not the same, determining, by the processing device, whether the software library and the field programmable device binary are available to deploy;
   responsive to determining the availability of the field programmable device binary, deploying the field programmable device binary to a field programmable device;
   responsive to determining the availability of the software library for use on a general purpose processor, deploying the software library for use on the general purpose processor;
   responsive to determining the software library and the field programmable device binary are the same, determining, by the processing device, whether to deploy the field programmable device binary to the field programmable device, based on a comparison of a workload response time to a workload response time goal until the response time goal is satisfied; and
   responsive to determining the response time goal is satisfied, deploying the field programmable device binary to the field programmable device.

2. The computer-implemented method of claim 1, wherein the field programmable device is one of a field-programmable gate array, a programmable read-only memory, or a programmable logic device.

3. The computer-implemented method of claim 1, further comprising:
   responsive to determining to not deploy the field programmable device binary to the field programmable device, waiting a delay period; and
   responsive to determining to not deploy the field programmable device binary to the field programmable device, determining, by the processing device, whether to deploy the field programmable device binary to the field programmable device.

4. The computer-implemented method of claim 1, further comprising:
   monitoring, by the processing device, performance of the application program interface.

5. The computer-implemented method of claim 4, wherein the monitoring is one of queue based or job based.

6. The computer-implemented method of claim 1, wherein at least one of the software library and the field programmable device binary is downloaded.

7. The computer-implemented method of claim 1, wherein the field programmable device binary of the field programmable device binary vendor and the software library of the software library vendor are created using a compatible specification.

8. A system for deploying a software library and a corresponding field programmable device binary, the system comprising:
   a memory having computer readable instructions; and
   a processing device for executing the computer readable instructions, the computer readable instructions comprising:
      determining whether the software library and the field programmable device binary are the same, which comprises receiving a verification certification from a software library vendor of the software library;
      responsive to determining the software library and the field programmable device binary are not the same, determining whether the software library and the field programmable device binary are available to deploy;

responsive to determining the availability of the field programmable device binary, deploying the field programmable device binary to a field programmable device;

responsive to determining the availability of the software library for use on a general purpose processor, deploying the software library for use on the general purpose processor;

responsive to determining the software library and the field programmable device binary are the same, determining whether to deploy the field programmable device binary to the field programmable device, based on a comparison of a workload response time to a workload response time goal until the response time goal is satisfied; and responsive to determining the response time goal is satisfied, deploying the field programmable device binary to the field programmable device.

9. The system of claim 8, wherein the field programmable device is one of a field-programmable gate array, a programmable read-only memory, or a programmable logic device.

10. The system of claim 8, the computer readable instructions further comprising:

responsive to determining to not deploy the field programmable device binary to the field programmable device, waiting a delay period; and responsive to determining to not deploy the field programmable device binary to the field programmable device, determining, by the processing device, whether to deploy the field programmable device binary to the field programmable device.

11. The system of claim 8, the computer readable instructions further comprising:

monitoring, by the processing device, performance of the application program interface.

12. The system of claim 11, wherein the monitoring is one of queue based or job based.

13. A computer program product for deploying a software library and a corresponding field programmable device binary, the computer program product comprising:

a computer readable storage medium having program instructions embodied therewith, the program instructions executable by a processing device to cause the processing device to:

determining whether the software library and the field programmable device binary are the same, which comprises receiving a verification certification from a software library vendor of the software library;

responsive to determining the software library and the field programmable device binary are not the same, determining whether the software library and the field programmable device binary are available to deploy;

responsive to determining the availability of the field programmable device binary, deploying the field programmable device binary to a field programmable device;

responsive to determining the availability of the software library for use on a general purpose processor, deploying the software library for use on the general purpose processor;

responsive to determining the software library and the field programmable device binary are the same, determining whether to deploy the field programmable device binary to the field programmable device, based on a comparison of a workload response time to a workload response time goal until the response time goal is satisfied; and responsive to determining the response time goal is satisfied, deploying the field programmable device binary to the field programmable device.

* * * * *